P. J. ROSS, DEC'D.
D. C. ROSS, ADMINISTRATOR.
TIRE INFLATER FOR AUTOMOBILES.
APPLICATION FILED JAN. 2, 1908.

899,620.

Patented Sept. 29, 1908.

Witnesses;
A. A. Olson
W. S. Austin

Inventor;
Peter J. Ross
by
Joshua R. H. Potts.
Atty.

UNITED STATES PATENT OFFICE.

PETER J. ROSS, OF TREVOR, WISCONSIN; DONALD C. ROSS, OF RYDNER, NORTH DAKOTA, ADMINISTRATOR OF SAID PETER J. ROSS, DECEASED.

TIRE-INFLATER FOR AUTOMOBILES.

No. 899,620.  Specification of Letters Patent.  Patented Sept. 29, 1908.

Application filed January 2, 1908. Serial No. 408,957.

To all whom it may concern:

Be it known that I, PETER J. ROSS, a citizen of the United States, residing at Trevor, county of Kenosha, and State of Wisconsin, have invented certain new and useful Improvements in Tire-Inflaters for Automobiles, of which the following is a specification.

My invention relates to automobiles and particularly to devices for inflating the tires of automobile wheels.

The object of my invention is to provide means for inflating automobile tires by power derived from the automobile engine.

A further object of my invention is to provide a device as mentioned so constructed that the pressure within the tire can only be raised to a certain predetermined degree.

A further object of my invention is to provide a device as mentioned which shall be operable to inflate the tire at such times only as the device is under the manual control of the operator to the end that the tire shall not be ruptured through neglect on the part of the operator.

Other objects will appear hereinafter.

With these objects in view my invention consists generally in an automobile tire inflater comprising an air pump adapted to be connected to and operated by the shaft of the engine when desired, a flexible hose of suitable length to readily reach either of the wheels of the automobile and means for connecting the end of said hose to the valve tube of the tire.

My invention further consists in a tire inflater comprising an air pump adapted to be connected to the shaft of the engine when desired, a flexible hose of suitable length extending from said pump and equipped with means at its free end to attach the same to the valve tube of a tire and so arranged as to normally exhaust into the atmosphere and suitable manually operated means for causing the same to exhaust into the tire.

My invention further consists in various details of construction and arrangements of parts all as will be hereinafter fully described and particularly pointed out in the claims.

Figure 1:
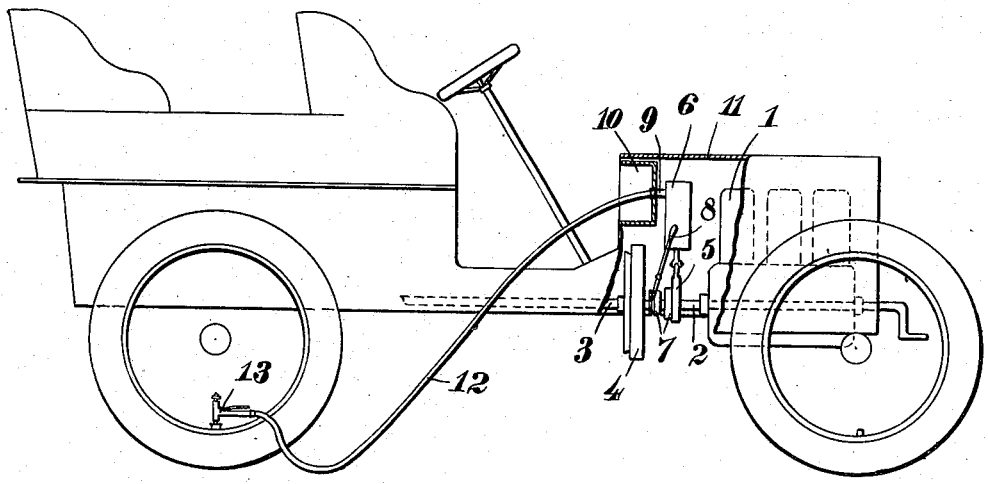
Figure 2:
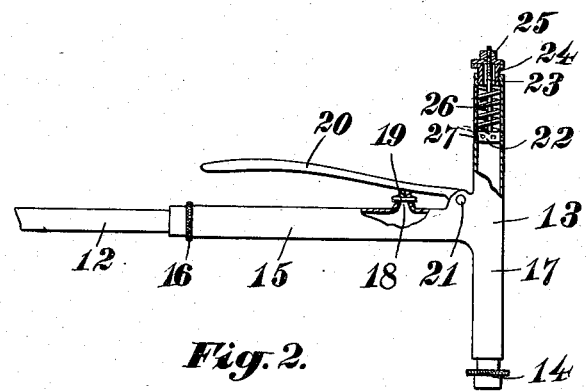

My invention will be more readily understood by reference to the accompanying drawing forming a part of this specification and in which, Figure 1 is a diagram illustrating an automobile equipped with a tire inflater embodying my invention, and Fig. 2 is a detail view upon an enlarged scale of the coupling member.

Referring to the drawing, 1 indicates the engine of an automobile, 2 the engine shaft and 3 the transmission shaft. Loosely mounted upon the engine shaft, preferably between the engine and the fly-wheel, 4 is an eccentric, 5, for operating the piston of an air pump, 6. 7 indicates a clutch, operated by a lever, 8 for coupling the eccentric with the engine shaft when it is desired to inflate the tire.

It is obvious that the air pump will be used only when the automobile is at rest, hence, it is connected or driven from the engine shaft instead of the transmission shaft.

Any suitable means for driving the air pump from the engine shaft may be employed but I find that illustrated in the drawings, simple and efficient.

The pump, 6 is provided with a discharge pipe, 9 extending into a box or receptacle 10 arranged in the end of the engine casing, 11 as shown. Coupled to the discharge pipe, 9 is a flexible hose, 12 equipped at the end with a coupling member, 13 by which it is attached to the plug of a tire. The hose, 12 is of sufficient length to reach any wheel of the automobile and when not in use is stored in the box, 10.

The coupling member, 13 is provided with a swivel nipple, 14 for attaching the device to the tire plug and is so constructed that it will operate only while a valve thereon is manually depressed by the operator. The coupling member may be of any preferred construction, but I prefer that illustrated in Fig. 2. As shown therein, it comprises a tubular member, 15 secured to the hose, 12 by a coupling 16 and a transverse tubular member, 17 arranged at right angles thereto and forming therewith a T shaped member, the nipple, 14 being arranged at one end of the portion, 17. The portion, 15 is provided with a discharge opening, 18 adapted to be closed by a valve, 19 arranged upon a lever, 20. The lever, 20 is pivoted to the member, 13 as at 21 and is arranged parallel with the portion, 15.

It is obvious that when the device is coupled to the tire and the engine started into operation, the air will exhaust through the discharge opening, 18 except when the lever, 20 is depressed. This is readily done by grasping the portion, 15 and the lever 20, with one hand.

It is evident that the operator cannot neglect the device while in operation and permit the same to explode the tire.

If desired a safety valve may be added to the device as an extra precaution. 22 indicates the safety valve mounted upon a stem, 23 which extends through the opposite end of the portion, 17 from the nipple, 14. 24 indicates a plug threaded into the end of the portion, 17 and 25 a nut threaded on the end of the rod, 23. Interposed between the plug, 24 and the valve, 22 is a spring, 26. The valve, 22 is normally set to close the discharge opening, 27 and the tension of the spring is set to permit the valve, 22 to rise when the pressure in the device exceeds a certain degree. The tension of the spring is adjusted by the nut, 25 and the position of the valve is regulated by the plug, 24.

Having described my invention what I claim as new and desire to secure by Letters Patent is:

1. An automobile tire inflater comprising an air pump adapted to be coupled to the engine shaft when desired, in combination with a flexible hose of suitable length extending from said air pump and a coupling member on the free end of said hose for attaching the same to the tire plug, said coupling member comprising a tubular handle portion attached to said hose and a transverse tubular portion arranged at the opposite end thereof forming a T shaped member, a coupling nipple arranged at one end of said transverse portion a safety valve arranged at the opposite end thereof, the first said tubular portion having a discharge opening, a valve for closing said opening and mounted upon a suitable lever, said lever being arranged substantially parallel with said handle portion and adapted to be simultaneously grasped therewith to manually depress the valve to close said discharge opening substantially as described.

2. An automobile tire inflater comprising an air pump adapted to be coupled to the engine shaft in combination with a flexible hose and a coupling member from the free end of said hose for attaching the same to a tire plug, said coupling member comprising a tubular handle portion attached to the hose and a transverse tubular portion arranged at the opposite end thereof forming a T shaped member, a coupling nipple arranged at one end of said transverse portion, a plug threaded in the opposite end of said portion, a threaded stem extending through said plug, a valve upon the inner end of said stem and fitting snugly within said transverse portion a spring interposed between said plug and said valve and a nut threaded upon the outer end of said stem, and said tubular portion being perforated and said perforations being normally closed by said valve, substantially as described.

In testimony whereof I have signed my name to this specification in the presence of two subscribing witnesses.

PETER J. ROSS.

Witnesses:
GEORGE W. FAULKNER,
J. F. THOMPSON.